United States Patent
Schmidt et al.

(10) Patent No.: US 8,715,816 B2
(45) Date of Patent: May 6, 2014

(54) MULTILAYER FILM AND METHOD FOR MANUFACTURING SAME

(75) Inventors: Harald Schmidt, Emmerich (DE); Christoph Hess, Kleve (DE); Johannes Mathar, Heerenberg (NL); Ralf Hackfort, Emmerich (DE)

(73) Assignee: Biotec Biologische Naturverpackungen GmbH & Co. KG, Deutschland (DE)

( * ) Notice: Subject to any disclaimer, the term of this patent is extended or adjusted under 35 U.S.C. 154(b) by 845 days.

(21) Appl. No.: 12/296,882

(22) PCT Filed: Apr. 11, 2007

(86) PCT No.: PCT/EP2007/053518
§ 371 (c)(1), (2), (4) Date: Dec. 30, 2008

(87) PCT Pub. No.: WO2007/118828
PCT Pub. Date: Oct. 25, 2007

(65) Prior Publication Data
US 2009/0179069 A1    Jul. 16, 2009

(30) Foreign Application Priority Data
Apr. 14, 2006 (DE) .................. 10 2006 018 060

(51) Int. Cl.
| | | |
|---|---|---|
| B32B 7/00 | (2006.01) | |
| B32B 7/04 | (2006.01) | |
| B32B 7/10 | (2006.01) | |
| B32B 9/02 | (2006.01) | |
| B32B 9/04 | (2006.01) | |
| B32B 27/06 | (2006.01) | |
| B32B 27/18 | (2006.01) | |
| B32B 27/22 | (2006.01) | |
| B32B 27/36 | (2006.01) | |
| B32B 37/02 | (2006.01) | |
| B32B 37/15 | (2006.01) | |

(52) U.S. Cl.
USPC ........... 428/215; 428/212; 428/213; 428/332; 428/337; 428/339; 428/480; 428/532; 156/244.11; 156/297; 264/171.1; 264/173.16

(58) Field of Classification Search
None
See application file for complete search history.

(56) References Cited

U.S. PATENT DOCUMENTS 5,108,807 A * 4/1992 Tucker ..................... 428/35.2
5,216,050 A * 6/1993 Sinclair ..................... 524/108

(Continued)

FOREIGN PATENT DOCUMENTS

| CN | 1723123 A | 1/2006 |
|---|---|---|
| EP | 0596437 | 2/1993 |

(Continued)

OTHER PUBLICATIONS

Office Action issued in Chinese Patent App. No. 200780020730.6 dated Nov. 21, 2012.

(Continued)

*Primary Examiner* — Vivian Chen
(74) *Attorney, Agent, or Firm* — Workman Nydegger

(57) ABSTRACT

A multilayered film is shown and described that is used in particular for packaging, which comprises at least one first layer A and at least one second layer B, wherein layer A contains thermoplastic polyester and layer B contains thermoplastic starch. The multilayered film according to the invention is characterized by excellent barrier properties, low sensitivity to moisture, and good mechanical strength.

45 Claims, 1 Drawing Sheet

(56) References Cited

U.S. PATENT DOCUMENTS

| | | | | |
|---|---|---|---|---|
| 5,391,423 | A * | 2/1995 | Wnuk et al. | 428/217 |
| 5,415,827 | A * | 5/1995 | Tomka et al. | 264/510 |
| 5,422,387 | A * | 6/1995 | Toms et al. | 524/52 |
| 5,439,985 | A * | 8/1995 | Gross et al. | 525/411 |
| 5,462,983 | A * | 10/1995 | Bloembergen et al. | 524/51 |
| 5,512,378 | A * | 4/1996 | Bastioli et al. | 428/484.1 |
| 5,691,403 | A * | 11/1997 | Shitaohzono et al. | 524/47 |
| 5,714,573 | A * | 2/1998 | Randall et al. | 528/354 |
| 5,756,194 | A * | 5/1998 | Shogren et al. | 428/312.4 |
| 5,844,023 | A * | 12/1998 | Tomka | 524/47 |
| 5,849,374 | A * | 12/1998 | Gruber et al. | 428/34.3 |
| 5,849,401 | A * | 12/1998 | El-Afandi et al. | 428/215 |
| 5,852,117 | A * | 12/1998 | Schoenberg et al. | 525/67 |
| 5,861,216 | A * | 1/1999 | Doane et al. | 428/532 |
| 5,883,199 | A * | 3/1999 | McCarthy et al. | 525/437 |
| 5,939,467 | A * | 8/1999 | Wnuk et al. | 523/128 |
| 6,096,809 | A * | 8/2000 | Lorcks et al. | 524/47 |
| 6,191,203 | B1 * | 2/2001 | Asrar et al. | 524/317 |
| 6,242,102 | B1 | 6/2001 | Tomka | |
| 6,365,079 | B1 * | 4/2002 | Winkler et al. | 264/143 |
| 6,376,583 | B1 * | 4/2002 | Winkler et al. | 524/47 |
| 6,756,331 | B2 * | 6/2004 | Kasemura et al. | 442/327 |
| 6,869,985 | B2 * | 3/2005 | Mohanty et al. | 523/124 |
| 7,256,223 | B2 * | 8/2007 | Mohanty et al. | 523/124 |
| 7,566,753 | B2 * | 7/2009 | Randall et al. | 525/190 |
| 7,579,413 | B2 * | 8/2009 | Mohanty et al. | 525/415 |
| 7,608,649 | B2 * | 10/2009 | Sun et al. | 524/47 |
| 7,847,021 | B2 * | 12/2010 | Shinoda et al. | 525/63 |
| 2001/0000742 | A1 * | 5/2001 | Karhuketo et al. | 428/480 |
| 2003/0166748 | A1 * | 9/2003 | Khemani et al. | 524/47 |
| 2003/0166779 | A1 * | 9/2003 | Khemani et al. | 525/178 |
| 2003/0187149 | A1 * | 10/2003 | Schmidt et al. | 525/418 |
| 2005/0151296 | A1 * | 7/2005 | Obuchi et al. | 264/171.13 |
| 2007/0042207 | A1 * | 2/2007 | Berger et al. | 428/480 |

FOREIGN PATENT DOCUMENTS

| | | | |
|---|---|---|---|
| FR | 2791603 | | 1/1999 |
| FR | 2791603 | * | 10/2000 |
| JP | 8187814 | | 7/1996 |
| JP | H0959498 | | 3/1997 |
| JP | 2000516878 | | 12/2000 |
| JP | 2003-145677 | * | 5/2003 |
| JP | 2005-248160 | * | 9/2005 |
| JP | 2006508830 | | 3/2006 |
| JP | H09316310 | | 12/2009 |
| WO | WO9202363 | | 1/1990 |
| WO | WO 90/01043 | * | 2/1990 |
| WO | WO 2004/052646 | * | 6/2004 |
| WO | WO2004052646 | | 6/2004 |
| WO | WO2006042364 | | 10/2005 |

OTHER PUBLICATIONS

Office Action issued in Japanese App. No. 2009504738 dated Apr. 23, 2012.

Second Office Action issued in Japanese App. No. 2009504738 dated Mar. 19, 2013.

Martin et al., Properties of Biodegradable Multilayer Films Based on Plasticized Wheat Starch; Starch (53) (2001) 372-380.

Wang et al., Preparation and Properties of Thermoplastic Starch-Polyester Laminate Sheets by Coextrusion; Polymer Engineering and Science, Feb. 2000, vol. 40, No. 2.

Avérous, Biodegradable Multiphase Systems Based on Plasticized Starch: A Review; Journal of Macromolecular Science, Part C-Polymer Reviews, vol. C44, No. 3, pp. 231-274. 2004.

Gaylord, Compatibilizing Agents: Structure and Function in Polyblends; Journal of Macromolecular Science, A26(8), pp. 1211-1229 (1989).

"Atofina introduces new epoxidized polyolefin with high fluidity"; Feb. 26, 2003 News Release; available at www.arkema-inc.com/index.cfm?pag=343&PRR_ID=407.

"DuPont Packaging Improves Bio-based and Biodegradable Packaging"; Aug. 31, 2006 News Release.

Bhattacharya, Residual stresses and density gradient in injection molded starch/synthetic polymer blends; Polymer 41 (2000) 9177-9190.

* cited by examiner

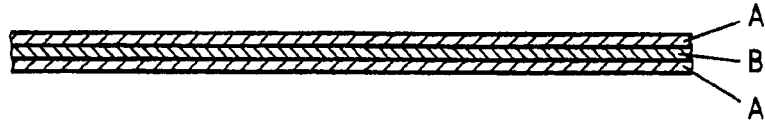

MULTILAYER FILM AND METHOD FOR MANUFACTURING SAME

BACKGROUND OF THE INVENTION (1) Field of the Invention

This invention relates to a multilayer film, in particular for packaging, which comprises at least two layers A and B. The invention further relates to a method for the manufacture of the multilayer film and packaging materials manufactured therefrom.

(2) Description of Related Art

Multilayer films of the type referred to in the preamble are generally known and are used, for example, for the packaging of foodstuffs and other goods. For the packaging of oxygen-sensitive foodstuffs it is further required that the films have low oxygen permeability. Such films are also referred to as "barrier films". They are used, for example, in the packaging of fresh meat or fruit and vegetables, the storage time of which can be substantially increased by the specific adjustment of the gas barriers, in particular the oxygen and/or water vapour barriers. The preponderant part of the barrier films used today in the packaging industry consists of plastics which are obtained on a petrochemical basis.

Due to economic and ecological considerations, there is an increasing demand for suitable films which are manufactured from renewable raw materials and/or are biologically degradable.

BRIEF SUMMARY OF THE INVENTION

The present invention therefore aims at providing a multilayer film of the type referred to in the preamble which possesses good barrier properties and which is manufactured from renewable raw materials and/or is biologically degradable.

Moreover, the film should have an adequate mechanical strength, be insensitive to moisture and be economical. Depending on its intended use, the film should have good transparency, if desired.

According to the invention, and as illustrated in FIG. 1, this is achieved by a multilayer film, in particular for packaging purposes, which comprises at least one first layer A and at least one second layer B, wherein layer A contains at least one thermoplastic polyester and layer B contains thermoplastic starch.

Advantageous embodiments of the invention are described in the dependent claims.

BRIEF DESCRIPTION OF THE DRAWING

FIG. 1 schematically illustrates an exemplary multi-layer film as disclosed herein.

DETAILED DESCRIPTION OF THE INVENTION

A substantial feature of the multilayer film according to the invention is that its layer structure contains on the one hand thermoplastic polyester (layer A) and, on the other, thermoplastic starch (layer B). It has surprisingly been found that multilayer films which contain this combination of materials have extraordinarily good properties as packaging films.

The films according to the invention are characterised by excellent barrier properties, and in particular have low oxygen and carbon dioxide permeability. The films further have excellent mechanical strength and low sensitivity to moisture. If desired, with the layer structure according to the invention films can also be manufactured which are capable of deep-drawing and have excellent transparency.

The multilayer film according to the invention is characterised by excellent mechanical strength and can be processed outstandingly in the manufacture of packaging elements. Thus, for example, with the layer structure according to the invention, tensile strength values according to DIN 53455 can be attained in the range from 10 to 40 N/mm$^2$, in particular 15 to 30 N/mm$^2$.

The multilayer films according to the invention are further characterised by excellent barrier properties. Thus, for example, the multilayer film according to the invention has preferably an oxygen permeability in accordance with ASTM F 1927-98 at 23° C. 50% r.h. and 400 µm film thickness of 1 to 50 cm$^3$/m$^2$ d, in particular 1.5 to 20 cm$^3$/m$^2$ d, and more particularly 2 to 10 cm$^3$/m$^2$ d. Further, the multilayer film according to the invention has preferably a water vapour permeability in accordance with ASTM F 1249 at 23° C., 75% r.h. and 400 µm film thickness of 1 to 100, in particular 2 to 10 cm$^3$/m$^2$ d. Finally, the multilayer film according to the invention has preferably a carbon dioxide permeability according to ASTM D 1434 at 23° C., 50% r.h. and 400 µm film thickness of 0.5 to 5, in particular 1 to 2.5 cm$^3$/m$^2$ d. Thanks to the barrier properties indicated above, the multilayer film according to the invention is excellently suited as a barrier film for packaging purposes.

The multilayer film according to the invention can have any desired thickness, wherein the thickness of the film significantly depends on the intended application purpose and the desired film properties. For packaging purposes, the film preferably has a total thickness of 10 to 2000 µm, in particular 100 to 2000 µm, and more preferably 200 to 800 µm, wherein the individual layers each preferably have a thickness from 5 to 1000 µm, in particular 10 to 1000 µm, preferably 20 to 700 µm, and more preferably 10 to 700 µm. Blown multilayer films have preferably a total thickness of 30 to 100 µm.

The packaging elements manufactured from multilayer films according to the invention may have any desired thickness. Trays manufactured from the multilayer films according to the invention for the packaging of foodstuffs have preferably a total thickness of 350 to 400 µm and the corresponding cover films preferably a thickness of 30 to 100 µm.

The multilayer film according to the invention comprises at least one layer A and at least one layer B. In addition to this, the film according to the invention can comprise an arbitrary number of further layers. According to a particularly preferred embodiment of the invention, the multilayer film according to the invention comprises at least two layers A and one layer B, wherein the layer B is arranged preferably between the layers A. Such a multilayer film has the following layer structure: layer A—layer B—layer A. See FIG. 1.

With such a layer structure, the layer A can be immediately adjacent to the layer B. It is also possible, however, for one or more further layers to be provided as intermediate layers, such as, for example, one or more tie layers H. Such tie layers H are known to the person skilled in the art and consist preferably of block copolymers. The tie layer H is delimited on one of its surface sides preferably directly by the layer A and on the other surface side directly by the layer B, and serves to improve the adherence between the layers A and B. As an example of a multilayer film according to the invention containing tie layers, the following layer structure can be indicated: layer A—tie layer H—layer B—tie layer H—layer A.

Depending on the intended use, the film can comprise further layers A and/or B. Also possible, for example, is a multilayer film with the following layer structure: layer A—layer B—layer A—layer B—layer A. Because of the layer B being provided doubled, such a film has even better barrier properties. In addition, a tie layer H can also be arranged between the individual layers.

According to the invention, layer A of the multilayer film contains at least one thermoplastic polyester. The selection of the thermoplastic polyester in this situation is not restricted. Both aliphatic and aromatic polyesters and their copolymers and/or mixtures are possible.

Thermoplastic polyesters are generally known in the art and described, for example, in Oberbach et al., "*Saechtling Kunstoff Taschenbuch*", 29$^{th}$ Ed., Hanser publishing house, Munich (2004).

According to a preferred embodiment of the invention, the thermoplastic polyester contained in layer A is a biologically degradable thermoplastic polyester according to EN 13432.

In particular, the thermoplastic polyester can be a biopolymer based on one or more hydroxy carboxylic acids.

Thermoplastic polyesters which are particularly well-suited according to the invention are poly[hydroxyalkanoates] (PHA), poly[alkylene succinates] (PAS) such as poly[butylene succinate] (PBS), poly[alkylene terephthalates] (PAT) such as poly[ethylene terephthalate] (PET), aliphatic-aromatic copolyesters and/or poly[p-dioxanon] (PPDO), as well as copolymers and mixtures of these. Also conceivable is the use of biopropane diol (bio-PDO) polyester alone or in combination with other thermoplastic polyesters.

According to a particularly preferred embodiment of the invention, layer A contains at least one poly[hydroxyalkanoate] (PHA) as a thermoplastic polyester. Examples of suitable poly[hydroxyalkanoates] are poly[hydroxyethanoate] such as polyglycolic acid (PGA), poly[hydroxypropanoate] such as polylactic acid or polylactide (PLA), poly[hydroxybutanoate] such as polyhydroxy butyric acid (PHB), poly[hydroxypentanoate] such as polyhydroxyvalerate (PHV) and/or poly[hydroxyhexanoate] such as polycaprolactone (PCL), as well as copolymers and mixtures of these.

An especially well-suited thermoplastic polyester in accordance with the invention is polylactic acid or polylactide (PLA). PLA is a biologically degradable polyester which can be manufactured from sugar by means of a multi-stage synthesis. In such multi-stage synthesis sugar is typically fermented to lactic acid and then polymerised to PLA via the intermediate stage of the dilactide. PLA is transparent, crystalline, stiff, has high mechanical strength, and can be processed via the conventional thermoplastic. Suitable polymers on the basis of PLA are described, for example, in documents U.S. Pat. No. 6,312,823, U.S. Pat. No. 5,142,023, U.S. Pat. No. 5,274,059, U.S. Pat. No. 5,274,073, U.S. Pat. No. 5,258,488, U.S. Pat. No. 5,357,035, U.S. Pat. No. 5,338,822, and U.S. Pat. No. 5,359,026. According to the invention, PLA can be used both as virgin material as well as in the form of recyclate.

A further particularly suitable thermoplastic polyester is polyhydroxy butyric acid (PHB). PHB is formed in nature from numerous bacteria as a storage and reserve substance. Accordingly, the technical manufacture of PHB can be effected by bacteria. Suitable polymers based on PHB are described, for example, in documents U.S. Pat. No. 4,393,167, U.S. Pat. No. 4,880,592, and U.S. Pat. No. 5,391,423.

As a material for layer A of the present invention, the "aliphatic polyester polymers" described in document U.S. Pat. No. 6,312,823 come into consideration in particular, and reference is expressly made here to their description, which is made the object of the present disclosure.

Suitable copolymers or mixtures of the said thermoplastic polyesters are, for example, polycaprolactone/polybutylene succinate mixtures or copolymers (PCL/PBS), polyhydroxy butyric acid/polyhydroxy valerate copolymers (PHB/PHV), polyhydroxy butyrate valerate (PHBV), polybutylene succinate/polybutylene adipate mixtures or copolymers (PBS/PBA), polyethylene terephthalate/polyethylene succinate copolymers (PET/PES), and/or polybutylene terephthalate/polybutylene adipate copolymers (PBT/PBA).

Layer A can contain further components in addition to thermoplastic polyesters. In particular, layer A can consist of a mixture of different polymers. Layer A can, in addition, contain conventional additives such as processing agents, plasticizers, stabilizers, anti-flammable agents, and/or filling agents. An adhesive can also be added to layer A, which can serve in particular to improve the adherence between layers A and B. Preferably, layer A contains thermoplastic polyester in an amount of at least 20% by weight, in particular at least 30% by weight or at least 40% by weight, more preferably at least 50% by weight or at least 60% by weight, and even more preferably at least 80% by weight, and most preferably at least 90% by weight or at least 95% by weight, based on the total weight of layer A. More preferably, layer A consists essentially of thermoplastic polyester.

Processing agents which can be used according to the invention are generally known to the person skilled in the art. In principle, in this situation all processing agents come into consideration which are suitable for improving the processing behaviour of the polymers used, and in particular their flow behaviour in the extruder.

According to the invention, particularly well suited processing agents are polymers which have a polymer backbone which is functionalised or modified with reactive groups. Such polymers are also referred to as "functionalised polymers". The processing agents used according to the invention have preferably a molecular weight of up to 200,000, in particular up to 100,000.

As the polymer backbone for the processing agent, in principle all polymers come into consideration which are miscible with at least one polymer component (e.g. PLA) from at least one layer of the multilayer film (e.g. layer A). Suitable polymer backbones for the processing agent are, for example, ethylene vinyl acetate (EVA), polyethylene (PE), polypropylene (PP), ethylene acrylates, polyester (e.g. PLA), and mixtures and/or copolymers of these (e.g. polyethylene methyl acrylate copolymer or polyethylene butyl acrylate copolymer).

As a reactive group for the processing agent used according to the invention, in principle all reactive groups come into consideration which are suitable for reacting chemically with at least one polymer component (e.g. TPS) from at least one layer of the multilayer film (e.g. layer B). Suitable reactive groups are, for example, maleic acid anhydride and/or other anhydrides of suitable carboxylic acids or dicarboxylic acids or other multibase acids.

Preferably, the polymer backbone is modified with reactive groups in an amount from 0.01 to 7% by weight, in particular 0.1 to 5% by weight, more preferably 0.3 to 4% by weight, based on the total composition of the processing agent. Preferably, the reactive groups are grafted onto the polymer backbone.

Processing agents of this type are commercially available, for example, under the trade names Lotader® and Orevac® (Arkema Inc., USA), Fusabond®, Biomax Strong® and Bynel® (DuPont, USA), and Plexar® (Equistar Chemical Company, USA).

The processing agent is preferably used in an amount of up to 5% by weight, in particular 0.01 to 2% by weight, more preferably 0.1 to 1.5% by weight, even more preferably 0.2 to 1% by weight, and most preferably in an amount of less than 1% by weight, based on the total composition of the individual layer. According to a particularly preferred embodiment of the invention, an ethylene based polymer modified with maleic acid anhydride, in particular a maleic acid anhydride modified polyethylene/alkyl acrylate copolymer, is used as the processing agent for layer A.

According to the invention it was found that, by using the processing agents mentioned, not only can the processing capability of the polymers used be improved (flow behaviour in the extruder, homogeneity of the melt), but also a substantially improved adhesive bond can be achieved between the layers.

According to the invention layer B of the multilayer film contains thermoplastic starch.

Thermoplastic starch or thermoplastically processable starch (TPS) is generally known and described in detail, for example, in documents EP 0 397 819 B1, WO 91/16375 A1, EP 0 537 657 B1, and EP 0 702 698 B1. With a market share of some 80 percent, thermoplastic starch constitutes the most important and most widely used representative of bioplastics. Thermoplastic starch is in general manufactured from native starch such as, for example, potato starch. In order to make native starch capable of thermoplastic processing, plasticizers such as sorbitol and/or glycerine are added to it. Thermoplastic starch is characterised by a low water content which amounts preferably to less than 6% by weight based on the total weight of the thermoplastic starch. Thermoplastic starch is also characterised by its preferably essentially amorphous structure.

According to a preferred embodiment of the invention, layer B is obtained by starting at least in part from thermoplastically processable starch with a water content of less than 6% by weight, preferably less than 4% by weight, in particular less than 3% by weight in based on the total composition of the starch.

It was found that, with the use of thermoplastically processable starch with the water contents indicated (<6% by weight), an improved flow behaviour can be achieved in the extruder, as well as reduced micro-bubble formation in the layer.

Preferably, however, the thermoplastically processable starch used has a water content of at least 1% by weight, in particular at least 1.5% by weight, since otherwise thermally-induced oxidation processes can easily occur, and therefore also undesirable discolouration of the product. Conversely, with a water content of greater than approx. 6% by weight increased micro-bubble formation can easily occur, which is likewise undesirable.

The thermoplastic starch contained in the layer B is preferably characterised in that a film manufactured from the thermoplastic starch has a tensile strength in accordance with DIN 53455 of 2 to 10 N/mm$^2$, in particular of 4 to 8 N/mm$^2$ and/or an elongation at break in accordance with DIN 53455 of 80 to 200%, in particular of 120 to 180%.

According to a further preferred embodiment of the invention, the thermoplastic starch can be obtained by: (a) mixing starch and/or a starch derivative with at least 15% by weight of a plasticizer, such as glycerine and/or sorbitol; (b) application of thermal and/or mechanical energy, and (c) at least partial removal of the natural water content of the starch or starch derivative to a water content of less than 6% by weight.

In addition to thermoplastic starch, layer B can also contain further components. In particular, layer B can consist of a mixture of different polymers. Layer B can, in addition, contain the conventional additives such as plasticizers, processing agents, stabilizers, anti-inflammable agents, and/or filling substances, as described above for layer A. In particular, layer B can contain suitable processing agents, as described in greater detail above in connection with layer A. An adhesive can also be added to layer B, which can serve in particular to improve the adherence between layers B and A.

Preferably, layer B contains thermoplastic starch in an amount of at least 20% by weight, in particular at least 30% by weight or at least 40% by weight, more preferably at least 50% by weight or at least 60% by weight, even more preferably at least 80% by weight, and most preferably at least 90% by weight or at least 95% by weight, based on the total weight of layer B. More preferably, layer B consists essentially of thermoplastic starch.

According to one embodiment of the invention, both layer A and layer B consist essentially of thermoplastic polyester and thermoplastic starch, respectively.

More preferably, layer B consists essentially of a polymer blend which contains thermoplastic starch and at least one further thermoplastic material, in particular thermoplastic polyester. As further thermoplastic material, it is possible to add in particular biologically degradable polymers such as polyesters, polyester amides, polyester urethanes and/or polyvinyl alcohol. The further thermoplastic material, in particular the thermoplastic polyester, can additionally be contained in the polymer blend in the form of recyclate of the multilayer film. It is therefore possible for the layer B to be manufactured from thermoplastic starch and a specific proportion of recyclate of the multilayer film, wherein the recyclate can be obtained, for example, from the cut residues accumulating during the manufacture of the film according to the invention. The further thermoplastic material, in particular the thermoplastic polyester, is contained in the polymer blend preferably in an amount of 1 to 80% by weight, in particular 5 to 30% by weight, based on the total weight of the polymer blend.

A particularly preferred multilayer film according to the invention is a three layered film of the type A-B-A, wherein layer A consists of a polymer based on PHA (in particular PLA) and layer B consists of a polymer based on thermoplastic starch (or a polymer blend containing thermoplastic starch).

The manufacture of the multilayer film according to the invention can be carried out in accordance with any desired manufacturing process, such as calendering, extrusion, or by casting. Such manufacturing processes are generally known to the person skilled in the art, and are described, for example, in J. Nentwig, "*Plastic Films*", 2$^{nd}$ Ed., Hanser Verlag, Berlin (2000), pages 39 to 63.

Preferably, the multilayer films according to the invention are formed by extrusion, in particular by blown film extrusion, flat film extrusion, cast film extrusion and/or blow moulding. These manufacturing processes are generally known to the person skilled in the art. A detailed description of these manufacturing processes can be found, for example, in J. Nentwig, "*Plastic Films*", 2$^{nd}$ Ed., Hanser Verlag, Berlin (2000), pages 45 to 60, to which reference is expressly made and which is made an object of this disclosure. The manufacturing examples described there can also be transferred to the manufacture of the multilayer film according to the invention. In this situation, both individual layers as well as all the layers of the film can be formed by extrusion. Preferably, all the layers of the film are formed by extrusion.

According to a particularly preferred embodiment of the invention, the multilayer film according to the invention is formed by co-extrusion. Such co-extrusion or multilayer extrusion processes are generally known to the person skilled in the art. A description of the co-extrusion process is to be found, for example, in J. Nentwig, "*Plastic Films*", 2$^{nd}$ Ed., Hanser Verlag, Berlin (2000), pages 58 to 60, to which reference is expressly made and which is made an object of this disclosure. The manufacturing examples described there can also be transferred to the manufacture of the multilayer film according to the invention.

Accordingly, the present invention further relates to a method for the manufacture of a multilayer film, wherein the multilayer film comprises at least one layer A, at least one layer B, and further layers if appropriate, and in particular, if appropriate, at least one further layer A, characterised by the following steps:

(a) Extrusion of a material containing at least one thermoplastic polyester to form a film, whereby at least one layer A is formed;

(b) Extrusion of a material containing thermoplastically processable starch to form a film, whereby at least one layer B is formed; and (c) At least partial bonding of the surface of the individual layers, whereby a multilayer film is formed.

The individual method steps (a) to (c) are preferably carried out simultaneously in the co-extrusion process, in particular by blown film extrusion, flat film extrusion, cast film extrusion, and/or blow moulding.

After its manufacture, the multilayer film can be cut into parts with the desired dimensions, depending on its intended use. The cutting residue which accumulates during the cutting to size can be added at least in part to the material for the extrusion of layer B in step (b) and can therefore serve as recyclate.

Finally, the invention relates to a packing element for foodstuffs, in particular for fresh meat, cheese, fresh fruit or vegetables, baked goods, beverages and/or coffee, which contains the multilayer film according to the invention.

The invention is described in greater detail hereinafter on the basis of examples which represent embodiments of the invention.

The single FIGURE shows by way of example a sectional view of a multilayer film according to the invention with a layer structure of the type A-B-A.

EXAMPLE 1

Manufacture of Thermoplastic Starch for the Middle Layer (Layer B)

A mixture of native potato starch (63% by weight), glycerine (23% by weight) and sorbitol (14% by weight) was filled into a twin-shaft extruder. The mixture was intensively mixed in the extruder in a temperature range from 130 to 160° C., wherein the melt was simultaneously degassed in order to draw water from the mixture. This results in a homogenous melt which can be drawn off and granulated. The water content of the thermoplastically processable compound, homogenised in the manner described, is between 3 and 4% by weight.

Due to the mixing and homogenisation of the native starch with glycerine and sorbitol, crystalline structures of the starch are broken up, such that the thermoplastic starch derived is present largely in an amorphous state. In contrast thereto, destructured starch, which can be manufactured from native starch, for example, by heating in water, still has a certain degree of crystallinity.

EXAMPLE 2

Manufacture of a Three-Layer Film (Flat Film)

A three-layer film (A-B-A) was manufactured, consisting of polylactic acid (PLA)/thermoplastic starch (TPS)/PLA. As starch, use was made of the thermoplastic glycerine/sorbitol starch manufactured in Embodiment Example 1, with a water content of 3 to 4% by weight. The polylactic acid used (PLA granulate, *Nature Works*) had a D-content of 1.4%.

The two materials (PLA and TPS) were run simultaneously in a co-extrusion machine to form a three-layer film. To achieve this, the TPS was melted in a single-shaft extruder with an L/D ratio of 33 in a temperature range of 140 to 190° C. The extruder was run at a speed of 100 rev/min. and produced, with a throughput of 25 kg/h, a melt pressure of 130 bar. In parallel with this, PLA was melted (melt temperature 177° C.) in a second single-shaft extruder (L/D=30, temperature 200° C., speed 20 rev/min., melt pressure 100 bar, throughput 10 kg/h). Both melts were combined in a coexadapter, wherein the PLA melt flow was divided and conducted half each above and below the starch layer (→outer layers A). The three-layer system produced in this way was drawn off through a slit die (T=190° C.) by means of temperature-controllable rollers (T=25° C., V=3 m/min), cut to width, and wound into a roll.

The total thickness 400 μm of the three-layer film thus produced is composed of 2×50 μm (outer layers A) and 300 μm (middle layer B).

For the three-layer film the following gas permeability values were determined:

Oxygen ($O_2$): 15.5 $cm^3/m^2$ d

Carbon dioxide ($CO_2$) 2.1 $cm^3/m^2$ d

EXAMPLE 3

Manufacture of a Three-Layer Film in Accordance with Example 2 with a Pre-Mixed Middle Layer (Layer B)

Analogous to the procedure described in Example 2, a three-layer film A-B-A was manufactured with PLA as the outer layer (A). For the middle layer (B), a pre-mix was prepared from the TPS granulate (90% by weight), manufactured in accordance with Example 1, and PLA granulate (10% by weight), introduced into the single-shaft extruder, and melted at 150 to 190° C. The extruder for the middle layer was run at 100 rev/min. at a throughput of 25 kg/h and a melt pressure of 120 bar. In parallel with this, in the second single-shaft extruder (temperature 185-200° C., speed 20 rev/min, melt pressure 130 bar, throughput 10 kg/h) PLA was melted (melt temperature 175° C.). Both melts were combined in the coex-adapter, wherein, as described in Example 2, the PLA melt flow was divided and conducted half above and half below the starch layer (→outer layers A). The three-layer system produced in this way was drawn off through a slit die (T=190° C.) by means of temperature-controllable rollers (T=35° C., V=2.7 m/min), cut to width, and wound into a roll.

The total thickness 400 μm of the three-layer film thus produced is composed of 2×50 μm (outer layers A) and 300 μm (middle layer B).

The three-layer film showed more substantial turbidity in comparison with Example 2, but a more stable bond was achieved between the outer layers (A) and the middle layer (B) in comparison with Example 2.

EXAMPLE 4

Manufacture of a Modified Thermoplastic Starch for the Middle Layer (Layer B)

A mixture of native potato starch (56.5% by weight), glycerine (20.5%), sorbitol (13%) and PLA (10%) was filled into a twin-shaft extruder. The mixture was intensively mixed in the extruder in a temperature range of 130 to 160° C., wherein the melt was simultaneously degassed in order to draw water out of the mixture. In a similar manner to Example 1, a homogenous melt was produced which can be drawn off and granulated. The water content of the thermoplastically processable compound homogenised in the manner described lies between 3 and 4% by weight.

EXAMPLE 5

Manufacture of a Three-Layer Film in Accordance with Example 2 with Modified Thermoplastic Starch in the Middle Layer (Layer B)

Analogous to the procedure described in Examples 2 and 3, a three-layer film A-B-A with PLA as the outer layer (A) was manufactured. For the middle layer (B), the thermoplastically processable starch/PLA compound described in embodiment Example 4 was introduced into the extruder and melted at 140 to 195° C. The extruder for the middle layer ran at 90 rev/min. at a throughput of 25 kg/h and a melt pressure of 115 bar.

In parallel with this, PLA was melted (melt temperature 180° C.) in the second single-shaft extruder (temperature 190-200° C., speed 25 rev/min, melt pressure 120 bar, throughput 10 kg/h).

Both melts were combined in the coex-adapter, wherein, as described in Examples 2 and 3, the PLA melt flow was divided and conducted half above and below the starch layer (→outer layers A). The three-layer system produced in this way was drawn off through a slit die (T=185° C.) by means of temperature-controllable rollers (T=35° C., V=3.1 m/min), cut to width, and wound into a roll.

The total thickness 400 μm of the three-layer film thus produced is composed of 2×50 μm (outer layers A) and 300 μm (middle layer B).

The three-layer film showed more substantial turbidity in comparison with the samples manufactured in accordance with Examples 2 and 3, but a more stable bond was achieved between the outer layers (A) and the middle layer (B) in comparison with Examples 2 and 3.

EXAMPLE 6

As in Example 2, but added to the polylactic acid (PLA) for the outer layer was an ethylene/methyl acrylate polymer functionalised with some 3% by weight maleic acid anhydride, in a quantity of some 1% by weight based on the total composition of the PLA layer. The three-layer film obtained in this way had an enhanced bond between the individual layers in comparison with the product described in Example 2.

EXAMPLE 7

Manufacture of a Three-Layer Film (Blown Film)

A three-layer film (A-B-A) consisting of polylactic acid (PLA)/thermoplastic starch (TPS)/PLA was manufactured. Used as starch was the thermoplastic glycerine/sorbitol starch manufactured in Example 1, with a water content of 3 to 4% by weight. The polylactic acid used (PLA granulate, Nature Works) had a D-content of 1.4%.

The two materials (PLA and TPS) were run simultaneously in a co-extrusion machine to form the three-layered film. To achieve this, the TPS was melted in a single-shaft extruder (Dr. Collin, dia. 45×25 D) in a temperature range of 140 to 160° C. The extruder was run at a speed of 20 rev/min and produced, with a throughput of approx. 7 kg/h, a melt pressure of 130 bar. In parallel with this, PLA was melted in a second single-shaft extruder (Dr. Collin, dia. 30×25 D, temperature 160-190° C., speed 60 rev/min, melt pressure 140 bar, throughput approx. 15 kg/h). Both melts were combined in a ring-shaped die (three-layer blown film die, dia. 80 mm, annular slit 1.1 mm), wherein the PLA melt flow was divided and conducted half above and below the starch layer (→outer layers A). The three-layer system thus produced was drawn with a blow-up ratio of 3.5 and a speed of approx. 4.5 m/min. as a hose with a total film thickness of approx. 50 μm and a laying width of 325 mm over each a chrome-plated and a rubberised roller (width in each case 400 mm) and wound into a roll. The percentage thickness ratio of the multilayered A-B-A film obtained was determined as 20-60-20.

EXAMPLE 8

Analogous to Example 7, but added to the polylactic acid (PLA) for the outer layer was an ethylene/methyl acrylate polymer functionalised with approx. 3% by weight maleic acid anhydride in an amount of approx. 1% by weight based on the total composition of the PLA layer. The three-layer film thus obtained had an enhanced bond between the individual layers in comparison with the product described in Example 7.

EXAMPLE 9

Analogous to Example 8, but added to the polylactic acid (PLA) for the outer layer was an aliphatic/aromatic copolyester (ECOFLEX® from BASF AG) in an amount of 5% by weight based on the total composition of the PLA layer. The system thus obtained had better processing capability in comparison with the formulation according to Example 7.

EXAMPLE 10

Analogous to Example 7, but a thermoplastic glycerine/sorbitol starch manufactured in accordance with Example 1 having a water content of approx. 2.5% by weight was used. The system thus obtained in this way had an improved processing capability in the extruder in comparison with Example 7 and less bubble formation in the middle layer.

The invention has been described heretofore on the basis of embodiment examples. It is understood here that the invention is not restricted to the embodiment examples described.

Rather, there are multiple possibilities for derivations and modifications open to the person skilled in the art within the framework of the invention and the scope of protection of the invention is determined in particular by the following claims.

The invention claimed is:

1. A multilayer film suitable for packaging purposes, comprising:
　　at least one first layer A; and
　　at least one second layer B,
　　wherein layer B contains thermoplastic starch,
　　wherein layer A contains thermoplastic polyester and at least one processing agent in an amount of at least 0.01% and up to 5% by weight based on the total composition of layer A, wherein the processing agent is selected from polymers comprising a polymer backbone functionalized or modified with reactive groups attached along the polymer backbone, wherein the polymer backbone of the processing agent is miscible with at least one polymer component in layer A, at least some of the reactive groups of the processing agent reacting chemically with the thermoplastic starch of layer B.

2. The multilayer film according to claim 1, wherein the thermoplastic polyester contained in layer A is a biodegradable thermoplastic polyester in accordance with EN 13432.

3. The multilayer film according to claim 1, wherein the thermoplastic polyester is a biopolymer based on one or more polyhydroxy carboxylic acids.

4. The multilayer film according to claim 1, wherein the thermoplastic polyester is selected from the group consisting of poly[hydroxyalkanoates] (PHA), poly[alkylene succinates] (PAS), poly[butylene succinate] (PBS), poly[alkylene terephthalates] (PAT), poly[ethylene terephthalate] (PET), aliphatic-aromatic copolyesters, poly[p-dioxanon] (PPDO), and copolymers and mixtures of the foregoing.

5. The multilayer film according to claim 4, wherein the thermoplastic polyester comprises at least one poly[hydroxyalkanoate] (PHA) selected from the group consisting of poly[hydroxyethanoate], polyglycolic acid (PGA), poly[hydroxypropanoate], polylactic acid (PLA), polylactide, poly[hydroxybutanoate] (PHB), polyhydroxyvalerate (PHV), polycaprolactone (PCL), and copolymers and mixtures of thereof.

6. The multilayer film according to claim 1, wherein layer B is obtained starting at least in part from thermoplastically processable starch having a water content of less than 6% by weight, based on the total composition of the starch.

7. The multilayer film according to claim 1, wherein layer B is obtained starting at least in part from thermoplastically processable starch having a water content of less than 3% by weight, based on the total composition of the starch.

8. The multilayer film according to claim 1, wherein layer B contains a thermoplastic starch adapted so that a film manufactured from the thermoplastic starch has a tensile strength in accordance with DIN 53455 of from 2 to 10 N/mm$^2$ and/or an elongation at break in accordance with DIN 53455 of from 80 to 200%.

9. The multilayer film according to claim 1, wherein layer B contains a thermoplastic starch adapted so that a film manufactured from the thermoplastic starch has a tensile strength in accordance with DIN 53455 of from 4 to 8 N/mm$^2$ and/or an elongation at break in accordance with DIN 53455 of from 120 to 180%.

10. The multilayer film according to claim 1, wherein the thermoplastic starch is obtainable by (a) mixing starch and/or a starch derivative with at least 15% by weight of a plasticizer, (b) applying thermal and/or mechanical energy, and (c) at least partially removing the natural water content of the starch or starch derivative to a water content of less than 6% by weight.

11. The multilayer film according to claim 10, wherein the plasticizer comprises glycerine and/or sorbitol.

12. The multilayer film according to claim 1, wherein layer A consists essentially of thermoplastic polyester and processing agent and/or layer B consists essentially of thermoplastic starch.

13. The multilayer film according to claim 1, characterised in that layer B consists essentially of a polymer blend containing thermoplastic starch and at least one further thermoplastic material.

14. The multilayer film according to claim 13, wherein the further thermoplastic material comprises thermoplastic polyester.

15. The multilayer film according to claim 13, wherein the further thermoplastic material is contained in the polymer blend in an amount of 1 to 80% by weight based on the total weight of the polymer blend.

16. The multilayer film according to claim 13, wherein the further thermoplastic material is contained in the polymer blend in an amount of 5 to 30% by weight based on the total weight of the polymer blend.

17. The multilayer film according to claim 13, wherein the further thermoplastic material is contained in the polymer blend as a recyclate of the multilayer film.

18. The multilayer film according to claim 1, wherein the film has a total thickness of 100 to 2000 µm.

19. The multilayer film according to claim 1, wherein the film has a total thickness of 200 to 800 µm.

20. The multilayer film according to claim 1, wherein each of layers A and B has a thickness of 10 to 1000 µm.

21. The multilayer film according to claim 1, wherein each of layers A and B has a thickness of 10 to 700 µm.

22. The multilayer film according to claim 1, wherein the film is a three-layer film with the following layer structure: layer A—layer B—layer A.

23. The multilayer film according to claim 1, wherein provided between the layer A and the layer B is at least one tie layer H so that the three-layer film has the following layer structure: layer A—tie layer H—layer B—tie layer H—layer A.

24. The multilayer film according to claim 23, wherein the tie layer H is comprised of block copolymer.

25. The multilayer film according to claim 1, wherein the film has a tensile strength in accordance with DIN 53455 of 10 to 40 N/mm$^2$.

26. The multilayer film according to claim 1, wherein the film has a tensile strength in accordance with DIN 53455 of 15 to 30 N/mm$^2$.

27. The multilayer film according to claim 1, wherein the film has an oxygen permeability in accordance with ASTM F 1927-98 at 23° C., 50% r.h. and 400 µm film thickness of 1 to 50 cm$^3$/m$^2$ d.

28. The multilayer film according to claim 1, wherein the film has an oxygen permeability in accordance with ASTM F 1927-98 at 23° C., 50% r.h. and 400 µm film thickness of 1.5 to 20 cm$^3$/m$^2$ d.

29. The multilayer film according to claim 1, wherein the film has a water vapour permeability in accordance with ASTM F 1249 at 23° C., 75% r.h. and 400 µm film thickness of 1 to 100 cm$^3$/m$^2$ d.

30. The multilayer film according to claim 1, wherein the film has a water vapour permeability in accordance with ASTM F 1249 at 23° C., 75% r.h. and 400 µm film thickness of 2 to 10 cm$^3$/m$^2$ d.

31. The multilayer film according to claim 1, wherein the film has a carbon dioxide permeability in accordance with ASTM D 1434 at 23° C., 50% r.h. and 400 µm film thickness of 0.5 to 5 cm$^3$/m$^2$ d.

32. The multilayer film according to claim 1, wherein the film has a carbon dioxide permeability in accordance with ASTM D 1434 at 23° C., 50% r.h. and 400 µm film thickness of 1 to 2.5 cm$^3$/m$^2$ d.

33. The multilayer film according to claim 1, wherein at least one layer of the film is formed by at least one extrusion process selected from blown film extrusion, flat film extrusion, cast-film extrusion, or blow moulding.

34. The multilayer film according to claim 1, wherein all the layers of the film are formed by at least one extrusion process selected from blown film extrusion, flat film extrusion, or blow moulding.

35. The multilayer film according to claim 1, wherein the film is formed by co-extrusion.

36. A packing element for foodstuffs, including for one or more of fresh meat, baked goods, cheese, fresh fruit or vegetables, beverages and/or coffee, the packing element comprising a multilayer film according to claim 1.

37. The multilayer film according to claim 1, wherein the polymer backbone is selected from ethylene vinyl acetate (EVA), polyethylene (PE), polypropylene (PP), ethylene acrylates, polyesters, polylactic acid (PLA), mixtures of the foregoing, and copolymers of the foregoing, and wherein reactive groups comprise repeating functional groups attached or grafted onto the polymer backbone.

38. The multilayer film according to claim 1, wherein reactive groups are grafted onto the polymer backbone and selected from maleic acid anhydride, anhydrides of carboxylic acids, anhydrides of dicarboxylic acids, and anhydrides of multibase acids.

39. A method for manufacturing a multilayer film that includes at least one layer A, at least one layer B, and optionally additional layers which optionally include at least one further layer A, the method comprising:
   (a) extruding a material containing at least one thermoplastic polyester and at least one processing agent comprising a polymer backbone functionalized or modified with reactive groups attached along the polymer backbone to form a film, whereby at least one layer A is formed;
   (b) extruding a material containing thermoplastically processable starch to form a film, whereby at least one layer B is formed; and
   (c) at least partially bonding a surface of individual layers, whereby a multilayer film is formed, at least some of the reactive groups of the processing agent in layer A reacting chemically with the thermoplastic starch of layer B.

40. The method according to claim 39, wherein (a) to (c) are carried out simultaneously in a co-extrusion process selected from blown film extrusion, flat film extrusion, cast-film extrusion, and/or blow moulding.

41. The method according to claim 39, further comprising cutting the multilayer film into parts having desired dimensions.

42. The method according to claim 41, wherein cutting residues which accumulate while cutting the multilayer are added at least in part to the material used for extruding layer B in (b).

43. The method according to claim 41, wherein the polymer backbone is selected from ethylene vinyl acetate (EVA), polyethylene (PE), polypropylene (PP), ethylene acrylates, polyesters, polylactic acid (PLA), mixtures of the foregoing, and copolymers of the foregoing, and wherein reactive groups comprise repeating functional groups attached or grafted onto the polymer backbone.

44. The method according to claim 41, wherein reactive groups are grafted onto the polymer backbone and selected from maleic acid anhydride, anhydrides of carboxylic acids, anhydrides of dicarboxylic acids, and anhydrides of multibase acids.

45. A multilayer film suitable for packaging purposes, comprising:
   a first layer A comprising a thermoplastic polyester and a processing agent comprising a polymer backbone functionalized or modified with reactive groups suitable for reaction with at least one polymer component of the multilayer film, wherein the polymer backbone is miscible with at least one polymer component of the first layer A, wherein the processing agent is included in a range of 0.01% to 5% by weight of layer A; and
   a second layer B comprising thermoplastic starch obtainable by mixing starch and/or a starch derivative with a plasticizer,
   wherein at least some of the reactive groups of the processing agent are reacted chemically with the thermoplastic starch of layer B.

* * * * *